United States Patent [19]

Senders

[11] 4,317,256
[45] Mar. 2, 1982

[54] EXPANDABLE MANDREL DEVICE FOR LONGITUDINAL SHIRRING OF FLEXIBLE TUBULAR MATERIAL

[75] Inventor: Henricus H. H. Senders, Eindhoven, Netherlands

[73] Assignee: Gunter Kollross, Dornheim, Fed. Rep. of Germany

[21] Appl. No.: 112,474

[22] Filed: Jan. 16, 1980

[51] Int. Cl.³ .............................................. A22C 13/02
[52] U.S. Cl. ......................................... 17/1 R; 17/41
[58] Field of Search ....................... 17/33, 42, 49, 1 R, 17/41; 53/563, 567, 575, 576, 581

[56] References Cited

U.S. PATENT DOCUMENTS

| | | | |
|---|---|---|---|
| 658,521 | 9/1900 | Atkinson | 17/33 |
| 1,616,971 | 2/1927 | Henderson | 17/49 X |
| 1,876,279 | 9/1932 | Dietrich | 17/42 |
| 3,540,076 | 11/1970 | Urbutis | 17/42 X |
| 4,028,775 | 6/1977 | Tysver | 17/33 X |

FOREIGN PATENT DOCUMENTS

| | | | |
|---|---|---|---|
| 2759005 | 7/1979 | Fed. Rep. of Germany | 17/42 |
| 604072 | 1/1926 | France | 17/49 |
| 58274 | 8/1946 | Netherlands | 17/42 |

*Primary Examiner*—Willie G. Abercrombie
*Attorney, Agent, or Firm*—Larson and Taylor

[57] ABSTRACT

A tubular mandrel device for longitudinally shirring flexible tube materials such as used in making sausage casings and the like. A tubular mandrel is formed by a plurality of parallel spring elements secured at one end and distributed in a cylindrical path around the axis of the mandrel. A control member moves axially within the tubular mandrel. Cam members fixed to the inside of the spring elements of the tubular mandrel cooperatively engage raised and lowered surfaces on the control member such that by moving the control member axially, the spring elements of the tubular mandrel are expanded outwardly.

15 Claims, 5 Drawing Figures

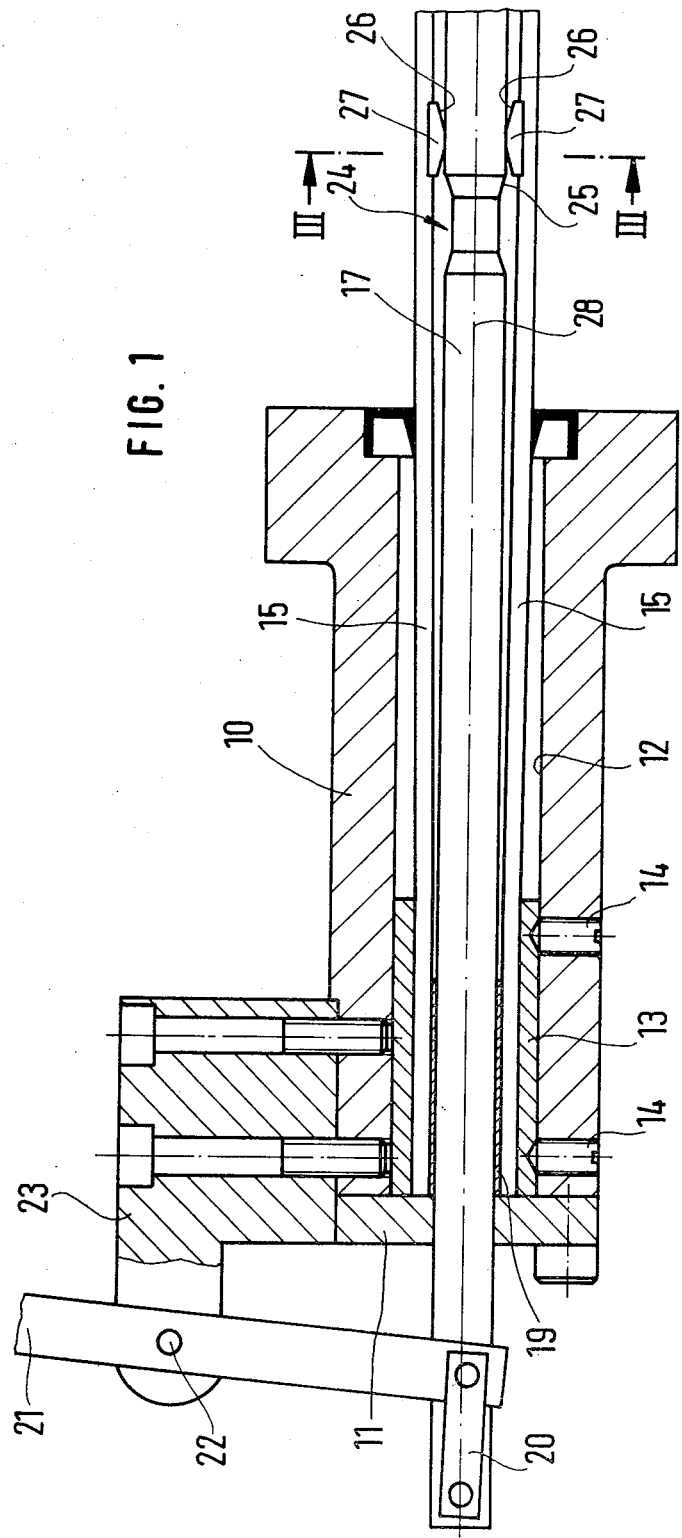

EXPANDABLE MANDREL DEVICE FOR LONGITUDINAL SHIRRING OF FLEXIBLE TUBULAR MATERIAL

FIELD OF THE INVENTION

This invention relates to a tubular mandrel for the longitudinal shirring of flexible tubular material, and in particular, synthetic gut material for making sausage casings and the like.

BACKGROUND OF THE INVENTION

Tubular mandrels are used for the manual shirring of such flexible tubular material as well as for the automatic shirring thereof by machines. These mandrels support the flexible tubular material while it is being shirred during the folding operation and to calibrate and thus form the corrugated tube prior to the later attachment of the tube to a stuffing nozzle of a sausage stuffing machine. By this arrangement the inwardly pointing folds of the corrugations sit snugly against the surface of the mandrel which, in the case of a shirring machine, makes difficult the subsequent stripping of the corrugated tube from the expander.

SUMMARY OF THE INVENTION

It is therefore an object of the present invention to provide a tubular mandrel device of the type described above, which permits extremely easy and therefore at the same time non-damaging stripping of the shirred tube by insuring that the diameter of the expandable mandrel can be varied adjacent the shirring section thereof.

Accordingly, the present invention relates to a device for the longitudinal shirring of a flexible tube material such as synthetic gut used in the making of sausage casings wherein the diameter of the mandrel is controllably expandable in the location where the shirring takes place.

The tubular mandrel of the present invention is formed by a plurality of generally parallel elongated elements secured at one end and distributed in a cylindrical path around the axis of the mandrel. Expanding means within the tubular mandrel are provided for expanding the elongated elements radially outwardly.

In a preferred arrangement of the present invention, the elongated elements are elongated spring elements connected at either one or both ends and a control member is provided within the tubular mandrel and axially movable along its axis. Cam elements fixed to the spring elements cooperate with raised and lowered surfaces on the control member such that by axial movement of the control member the cam members are operated to either expand the spring elements radially outwardly or permit them to relax to their normal position.

In accordance with a preferred arrangement of the present invention, the spring elements at one end are connected within a housing which also mounts the control member for sliding axial movement. Within the bore of the housing the spring-like elements are secured between a centering sleeve on the outer side thereof and a guide sleeve on the inner side thereof, the latter further surrounding the control member. At the opposite or free end of the mandrel, a further centering sleeve is provided for securing the free end of the spring element and also for guiding the control member.

BRIEF DESCRIPTION OF THE DRAWINGS

There follows a detailed description of a preferred embodiment of the present invention to be read together with the accompanying drawings wherein:

FIG. 1 is a longitudinal axial sectional view through a device made in accordance with the present invention;

FIG. 2 is a longitudinal axial sectional view of the free end of the tubular mandrel.

DETAILED DESCRIPTION OF THE PREFERRED EMBODIMENT

Figure 3:
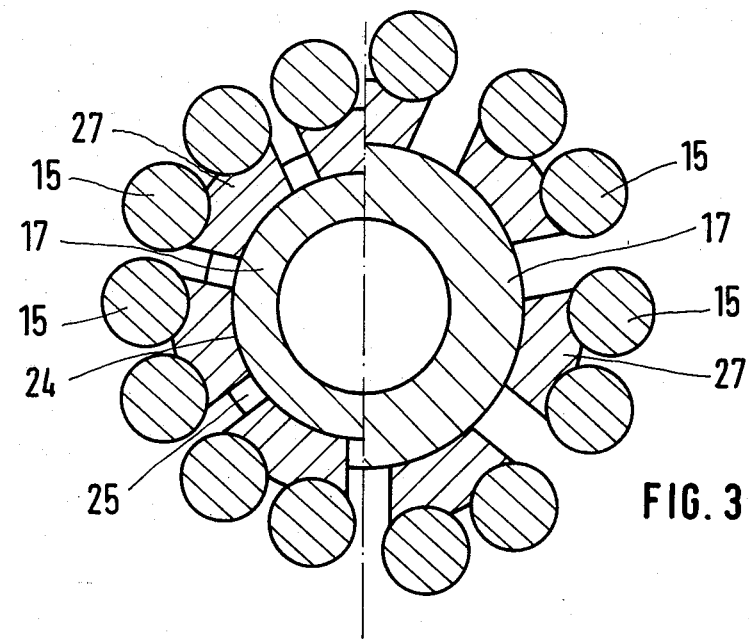
FIG. 3 is a cross-sectional view, taken along line III—III of FIG. 1, but on a larger scale, wherein the right hand side of FIG. 3 is a true sectional view along said line and the left hand side illustrates the parts in a different position.
Figure 4:
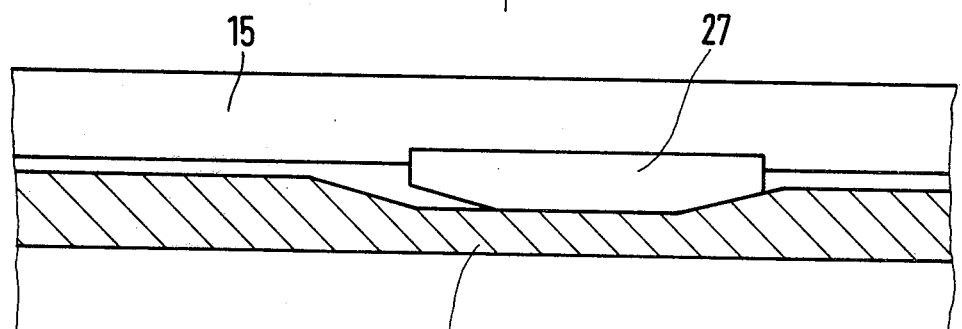
FIG. 4 is an enlarged view of a portion of FIG. 1 but with the elements in a moved position corresponding to the left hand side of FIG. 3.

Referring now to the drawings, like elements are represented by like numerals throughout the several views.

Referring now to the drawings, there is shown a holding support or housing (10) having a central bore (12) extending therethrough with the rear end covered by an end member (11). Within the rear end of bore (12) up against end member (11) there is provided a rear centering sleeve (13) held in place by means of screws (14). This centering sleeve (13) embraces a number of elongated spring elements (15) which are preferably wires of circular cross-section formed of spring steel. In the present example, fourteen such spring elements are provided. These spring elements at their rear end are welded or otherwise soldered to the sleeve (13). The spring elements then protrude therefrom beyond the forward end of the housing (10) and form the tubular mandrel. They preferably extend for approximately one meter or possibly even more. At the free end of the mandrel, the spring elements (15) may be welded or soldered to a reduced cross-section area of a front centering sleeve (15) which at its forward end is tapered so that it might act as a guide member for guiding the tubular mandrel (16) within the opening of a tube of flexible material.

In this manner, the spring elements (15) form a tubular mandrel for the purpose of longitudinal shirring of flexible tube material, and in particular, synthetic gut used in the making of sausage casings and the like.

A laterally movable control member (17), preferably in the form of a hollowed tube is arranged within the tubular mandrel formed by elements (15). At its forward end this control member includes a portion (18) of reduced cross-section which fits slidably within the interior of front centering sleeve (16).

In the area of the holding support or housing (10), the control member (17) extends rearwardly to and through the end member (11). At the rear portion of the bore (12) within the rear centering sleeve (13) a guide sleeve (19) is provided which surrounds the control member (17) and further secures the rear end of the spring elements (15). Rearwardly beyond end member (11) the control member (17) is pivotally connected to a link element (20) which in turn is pivotally connected to an activating lever (21) which is in turn pivotally connected at (22) to a bracket (10) secured by some of the screws (14) to the housing or holding support (10).

The control member (17) is provided with a low surface (24). As shown in the drawing, this low surface is formed by a recess (24) which extends continuously circumferentially around the control member (17). In an alternative embodiment, the continuous recessed area can be replaced by separate recesses, one for each of the cam members to be described below. In the present embodiment this recess (24) includes at both of its ends a tapered conical portion (25), the purpose of which is to facilitate movement of the cam members into and out of the recess (24). The control member (17) includes a major portion of essentially uniform cross-section above the conical surfaces (25) and at this height the control member forms the raised portion thereof.

For cooperating with the raised and lowered surfaces of the control member (17) there is provided a plurality of cam members (27) which include an essentially flat inner portion and tapered conical end portions (26). The cam members are secured by welding or the like to the interior of the spring elements (15). Preferably, as shown in FIG. 3, each cam member will be secured to two spring members (15) i.e. to adjacent pairs thereof. The cam members (27) will of course be equi-angularly spaced about the axis of the mandrel.

Figure 5:
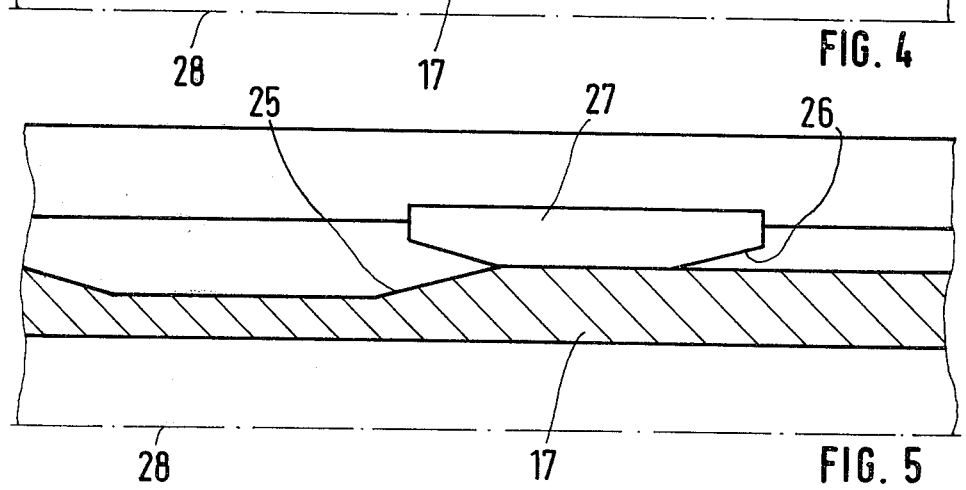
FIG. 5 is an enlarged view similar to FIG. 4 but showing the parts as they appear in FIG. 1 and corresponding to the right hand side of FIG. 3.

When the control member (17) is in the position as shown in FIGS. 1, 2, 5 and the right hand side of FIG. 3, then the cam members (27) rest upon the raised surface of the control member (17) thus urging the spring elements (15) radially outwardly into the expanded position. The entire shirring location of the mandrel is thus expanded in order to shirr the flexible tube material and to calibrate the thus formed corrugated synthetic tube.

Once the shirring process has been completed, the activating lever (21) would be pivoted counter-clockwise, moving the recess (24) into engagement with the cam members (27) so that they move inwardly, thus permitting inward movement of the spring elements (15). By thus effectively reducing the diameter of the tubular mandrel (15), the corrugated synthetic tube thus formed can be easily stripped from the tubular mandrel by its free end without resistance.

To repeat the operation, the activating lever (21) would be pivoted clockwise, moving control member (17) to the left as shown in the figures so that the conical end surfaces (25) of the recess (24) will contact the conical surfaces (26) of the cam members (27) and thereby again spread the spring elements (15) of the tubular mandrel.

Because the control member (17) is formed as a hollow tube, it is possible to blow air under pressure into the center thereof in the conventional manner and into the gut material to be corrugated or shirred. It is for this reason that the free end of control member (17) may be provided with a nozzle (not shown).

Although the invention has been described in considerable detail with respect to a preferred embodiment thereof, it will be apparent that the invention is capable of numerous modifications and variations apparent to those skilled in the art without departing from the spirit and scope of the invention.

I claim:

1. A device for the longitudinal shirring of a flexible tube material such as synthetic gut used in making sausage casings, comprising:

a tubular mandrel formed by at least three generally parallel rod-like elongated spring elements, secured at one end and distributed in a cylindrical path around the axis of the mandrel, and expanding means within the tubular mandrel for expanding the elongated elements radially outwardly by urging the said elongated elements radially outwardly at the location along the axis of the tubular member at which the shirring takes place.

2. A device according to claim 1, said expanding means comprising an axially movable control member within the tubular mandrel, and cam means for urging the spring elements radially outwardly upon axial movement of the control member.

3. A device according to claim 2, said cam means comprising cam members attached to the inside of the spring element, and said control member including a low surface and a raised surface, each positioned to cooperate with each cam member, such that when the cam members cooperate with their respective low surfaces the tubular mandrel is in its normal position and when the cam members cooperate with their respective raised surfaces, the spring elements are expanded radially outwardly.

4. A device according to claim 3, wherein the spring elements are constructed from round wires of spring steel.

5. A device according to claim 4, wherein said cam members are secured to circumferential sections of the round wires.

6. A device according to claim 5, wherein pairs of round wires are secured to a single cam member.

7. A device according to claim 3, said control member having a generally uniform cross section which forms the high surface and said control member having a recessed portion which cooperates with each said cam member to form the low surface.

8. A device according to claim 7, said cam members having tapered ends, and said cooperating recess or recesses being tapered from the low surface up to the high surface, whereby the cam members can move smoothly, axially, between the low and high surfaces.

9. A device according to claim 2, wherein the spring elements, at the free end of the mandrel, which is the end opposite from said one end, are secured to a front centering sleeve which at the same time serves as a guide for the control member.

10. A device according to claim 9, wherein the spring elements are secured at said one end within a rear centering sleeve.

11. A device according to claim 10, including a guide sleeve at said one end on the outside of the control member and securing the spring elements between it and the said rear centering sleeve.

12. A device according to claim 11, wherein the rear centering sleeve is located within the bore of a holding support having a length such that the frontal surface of the support facing towards the free end of the mandrel is located within the shirring location of the mandrel, thus forming a supporting surface for the tube material to be shirred.

13. A device according to claim 2, including a housing having means for supporting said one end of the spring elements and for supporting the control member for limited axial movement relative to the housing and the spring elements.

14. A device according to claim 13, said control member being of generally uniform cross-section and having one or more recesses at the shirring location, and said spring elements having cam members fixed to the inside of the spring elements and normally located within the recess or recesses, and which ride up beyond the recesses to expand the spring elements radially outwardly upon longitudinal movement of the control member.

15. A device according to claim 14, said spring elements being secured at the free end of the mandrel to a front centering sleeve which at the same time serves as a guide for the control member and at their rear ends within a rear centering sleeve, and including a guide sleeve at said one end and located on the outside of the control member and securing the spring elements between it and the said rear centering sleeve.

* * * * *